(12) United States Patent
Tian et al.

(10) Patent No.: US 8,310,534 B2
(45) Date of Patent: Nov. 13, 2012

(54) THREE-DIMENSIONAL MODEL DATA CONFIRMING METHOD, AND THREE-DIMENSIONAL MODEL DATA CONFIRMING APPARATUS

(75) Inventors: Xiaodong Tian, Davis, CA (US); Makoto Fujishima, Yamatokoriyama (JP)

(73) Assignees: Mori Seiki Co., Ltd., Yamato-Koriyama (JP); Intelligent Manufacturing Systems International, San Francisco, CA (US)

( * ) Notice: Subject to any disclaimer, the term of this patent is extended or adjusted under 35 U.S.C. 154(b) by 1112 days.

(21) Appl. No.: 12/281,110

(22) PCT Filed: Aug. 31, 2007

(86) PCT No.: PCT/JP2007/066988
§ 371 (c)(1), (2), (4) Date: Aug. 28, 2008

(87) PCT Pub. No.: WO2008/026723
PCT Pub. Date: Mar. 6, 2008

(65) Prior Publication Data
US 2009/0015668 A1 Jan. 15, 2009

Related U.S. Application Data

(60) Provisional application No. 60/824,285, filed on Sep. 1, 2006, provisional application No. 60/863,107, filed on Oct. 26, 2006.

(51) Int. Cl.
*H04N 7/18* (2006.01)
*H04N 9/47* (2006.01)
(52) U.S. Cl. ......................... 348/92; 348/129
(58) Field of Classification Search .............. 348/92, 348/129
See application file for complete search history.

(56) References Cited

U.S. PATENT DOCUMENTS

| | | | | |
|---|---|---|---|---|
| 5,969,753 A | * | 10/1999 | Robinson | 348/130 |
| 6,046,745 A | * | 4/2000 | Moriya et al. | 345/420 |
| 2004/0107018 A1 | | 6/2004 | Nakamura | |
| 2009/0284527 A1 | * | 11/2009 | Ofek et al. | 345/420 |

FOREIGN PATENT DOCUMENTS

| | | |
|---|---|---|
| EP | 1 424 656 A2 | 6/2004 |
| JP | 09-212219 A | 8/1997 |
| JP | 2004-185123 A | 7/2004 |
| JP | 2005-078441 A | 3/2005 |

OTHER PUBLICATIONS

International Search Report of PCT/JP2007/066988, date of mailing Oct. 2, 2007.

* cited by examiner

*Primary Examiner* — Kristie Shingles
(74) *Attorney, Agent, or Firm* — Westerman, Hattori, Daniels & Adrian, LLP

(57) ABSTRACT

The present invention relates to an apparatus for confirming three-dimensional model data or the like, capable of confirming easily, efficiently, and precisely whether three-dimensional model data including an attached object attached to a machine tool and at least a part of the machine tool good are accurate. An apparatus 1 for confirming three-dimensional model data is provided with: CCD cameras 13 and 14 for imaging an actual attached object attached to a machine tool 30 to generate actual image data of the attached object; a model-data storing section 17 for storing in advance model data which include the attached object attached to the machine tool 30 and at least a part of the machine tool 30 and which are previously created; a virtual image data generating section 19 for generating, by a computer process, two-dimensional image data, which are virtual image data of the attached object, based on the model data stored in the model-data storing section 17; and an image-data comparing section 21 for comparing, by a computer process, the actual image data of the attached object and the virtual image data thereof to determine whether these image data match.

3 Claims, 6 Drawing Sheets

US 8,310,534 B2

THREE-DIMENSIONAL MODEL DATA CONFIRMING METHOD, AND THREE-DIMENSIONAL MODEL DATA CONFIRMING APPARATUS

TECHNICAL FIELD

The present invention relates to a method and an apparatus for confirming three-dimensional model data, which confirm whether model data which are previously created, the three-dimensional model data comprising an attached object including a workpiece, a jig for attaching the workpiece and the like, attached to a machine tool, and at least a part of the machine tool, are accurate.

BACKGROUND ART

A machine tool is, for example, configured by: a table having a workpiece mounted and fixed on its top surface by the jig for attaching the workpiece; a main spindle for retaining a tool; a drive mechanism for moving the table and the main spindle (workpiece and tool) relative to each other; a control device for controlling the drive mechanism based on an NC program previously created; and other components.

The NC program is created by an operator, a programming device, or the like. However, if there is an error, there is a possibility that an accident in which the tool and the workpiece or the jig for attaching the workpiece interfere with each other occurs. To avoid this, as disclosed in Japanese Unexamined Patent Application Publication No. 2006-004128, an interference simulation is conducted on a computer using three-dimensional model data of a machine tool to check whether the NC program has an error.

Patent document 1: Japanese Unexamined Patent Application Publication No. 2006-004128

DISCLOSURE OF INVENTION

Problem Invention is to Solve

Incidentally, in the interference simulation using the three-dimensional model data, when a workpiece subject to machining (that is, a workpiece on the table) or a jig for attaching the workpiece is changed, at least a workpiece portion or a jig portion of the three-dimensional model data of the machine tool must be corrected and updated to accommodate the change.

However, the three-dimensional model data of the workpiece or the jig (the attached object), which are used for correction and updating, are sometimes caused to be different from their actual shapes by, for example, an error by an operator who creates the data, a design change after the three-dimensional model data of the attached object are created, and other reasons. In this case, a correct interference simulation cannot be performed. There is another case where an attaching condition of the attached object on a three-dimensional model of the machine tool and an actual attaching condition differ, and in this case also, the correct interference simulation cannot be performed.

Therefore, it is convenient if it is possible to confirm easily and efficiently whether the three-dimensional model data of the machine tool including the attached object are accurate, that is, whether the three-dimensional model data are in accordance with an actual condition of the machine tool.

The present invention has been conducted under the aforementioned circumstances, and an object thereof is to provide a method and an apparatus for confirming three-dimensional model data, capable of confirming easily, efficiently, and precisely whether three-dimensional model data which include an attached object attached to a machine tool and at least a part of the machine tool and which are previously created are accurate.

Means for Resolving the Problem

To achieve the aforementioned object, the present invention is:

a method for confirming whether data which are previously created and are related to a three-dimensional model including an attached object attached to a machine tool and at least a part of the machine tool, the model data including shape data which define shapes of the machine tool and the attached object, are accurate, comprising:

an actual-image-data generating process in which an actual attached object attached to the machine tool is imaged by an imaging camera from previously set one or more view point to generate two-dimensional image data;

a virtual-image-data generating process for generating, by a computer process, two-dimensional data of the attached object based on the model data which are previously created and include the attached object and the at least a part of the machine tool, the means in which a three-dimensional space is virtually set, the three-dimensional model including the attached object and the at least a part of the machine tool is disposed within the space, and a camera of the same condition as that of the imaging camera is virtually set and disposed, thereby generating the two-dimensional image data estimated to be obtained when the attached object related to the three-dimensional model, as well as the actual attached object, is imaged by the camera virtually set and disposed from the same view point as the previously set view point; and an image-data comparing process for comparing, by a computer process, the two-dimensional image data related to the actual attached object generated in the actual-image-data generating process and the two-dimensional image data of the attached object related to the three-dimensional model generated in the virtual-image-data generating process to determine whether these two-dimensional image data match.

The method for confirming model data can be preferably implemented by a following apparatus for confirming model data:

That is, the apparatus for confirming model data is:

an apparatus for confirming three-dimensional model data, which confirms whether data which are previously created and are related to a three-dimensional model including an attached object attached to the machine tool and at least a part of the machine tool, the model data including at least shape data which define shapes of the machine tool and the attached object, are accurate, the apparatus comprising:

an imaging camera for imaging an actual attached object attached to the machine tool from previously set one or more view point to generate two-dimensional image data; and a computer to which the imaging camera is connected, wherein the computer is configured to function as:

model-data storing means for storing the model data which are previously created and include the attached object and the at least a part of the machine tool;

virtual-image-data generating means for generating two-dimensional data of the attached object based on the model data stored in the model-data storing means, the means in which a three-dimensional space is virtually set, the three-dimensional model including the attached object and the at least a part of the machine tool is disposed within the space, and a camera of the same condition as that of the imaging camera is virtually set and disposed, thereby generating the two-dimensional image data estimated to be obtained when the attached object related to the three-dimensional model, as well as the actual attached object, is imaged by the camera virtually set and disposed from the same view point as the previously set view point; and image-data comparing means for comparing the two-dimensional image data related to the actual workpiece generated by the imaging camera and the two-dimensional image data of the attached object related to the three-dimensional model generated by the virtual-image-data generating means to determine whether these imaging data match.

According to the apparatus for confirming three-dimensional model data, the model data (three-dimensional model data) including the attached object attached to the machine tool and at least the part of the machine tool (for example, model data of a machining center including at least a table on which the workpiece is mounted, or model data of a lathe including at least a main spindle for holding the workpiece) are previously created, and the created model data are stored in the model-data storing means. It is noted that in the present invention, a concept of the workpiece includes a jig for attaching the workpiece to the machine tool. Further, the object to be attached may include, but not limited to, a workpiece, a jig for attaching the workpiece, or the like, for example. When the object to be attached is the workpiece or the jig, model data including the workpiece attached to the machine tool and at least a part of the machine tool, or model data including the jig attached to the machine tool and at least a part of the machine tool, or model data including the workpiece attached to the machine tool, the jig, and at least a part of the machine tool, are stored in the model-data storing means.

Subsequently, the actual attached object attached to the machine tool is imaged by the imaging camera, thereby generating two-dimensional image data of the actual attached object, and in addition, two-dimensional data of the attached object are generated by the virtual-image-data generating means based on the model data stored in the model-data storing means. The two-dimensional data is two-dimensional image data estimated to be obtained as follows: a three-dimensional space is virtually set; the three-dimensional model including the attached object and at least the part of the machine tool is disposed within the space, and a camera of the same condition (which means parameters are the same, such as a focal length, a coordinate value of principal point, a center coordinate value of an image-pickup surface, a deviation amount between the center coordinate value of the image-pickup surface and the coordinate value of principal point, a radial distortion correction coefficient, a tangential distortion correction coefficient, for example) as that of the imaging camera is virtually set and disposed; and the attached object related to the three-dimensional model, as well as the actual attached object, is imaged by the camera virtually set and disposed from the same view point as the previously set view point.

Thereafter, the two-dimensional image data (actual image of the attached object) related to the actual attached object generated by the imaging camera, and the two-dimensional image data (virtual image of the attached object) of the attached object related to the three-dimensional model generated by the virtual-image-data generating means are compared by the image-data comparing means to determine whether these image data match. The determination can be performed by confirming whether gray level values of each pixel in the two-dimensional image data each generated by the imaging camera and the virtual-image-data generating means are the same, or can be performed by detecting edges of the attached object from each actual image data to confirm whether positions and lengths of the detected edges are the same, and so on.

When the actual image and the virtual image match, it is determined that the three-dimensional model data including the attached object and at least a part of the machine tool are accurate, that is, it is determined that a shape of the attached object, a mounting position thereof, and a mounting attitude thereof match those of the actual attached object. When the actual image data and the virtual image data do not match, it is determined that the three-dimensional model data including the attached object and at least a part of the machine tool are wrong, that is, it is determined that the shape of the attached object, the mounting position thereof, and the mounting attitude thereof do not match those of the actual attached object. When it is determined that the three-dimensional model data are wrong, a message to this effect is displayed on a screen, or measures for disabling a start of machining is taken.

Thus, according to the method and the apparatus for confirming three-dimensional model data according to the present invention, the actual image of the attached object obtained by the imaging camera and the virtual image of the attached object generated based on the three-dimensional model data including the attached object and at least the part of the machine tool are compared to determine whether the three-dimensional model data including the attached object and at least the part of the machine tool are in accordance with an actual state of the machine tool. Therefore, it is possible to confirm easily, efficiently, and precisely whether the three-dimensional model data including the attached object and at least the part of the machine tool are accurate.

Further, it is possible to prevent an interference simulation in which inaccurate three-dimensional model data are used, for example, or possible to prevent a case where it is determined that there is no error in an NC program by the interference simulation using the wrong three-dimensional model data, and a machining is performed according to such an NC program.

Further, the computer may be configured to further function as model-data updating means for updating the model data related to at least a part of the machine tool to match an actual operation of the machine tool.

In the method and apparatus for confirming model data described above, the attached object may be imaged from one or more view point. When the attached object is imaged from two view points, for example, an actual attached object attached to the machine tool is imaged by an imaging camera from a first view point and a second view point apart from the first view point to generate two-dimensional image data in each view point. In addition, based on the three-dimensional model data including the attached object and at least a part of the machine tool, two-dimensional image data estimated to be obtained when the attached object related to the three-dimensional model is imaged from the same view points as those of the first and second view points are generated by the virtual-image-data generating means. Further, the two-dimensional image data from the first view point generated by the imaging camera and the two-dimensional image data from the first view point generated by the virtual-image-data generating means, and the two-dimensional image data from the second view point generated by the imaging camera and the two-dimensional image data from the second view point generated by the virtual-image-data generating means are compared, respectively, to determine whether these image data match.

Effects of the Invention

Thus, according to a method and an apparatus for confirming three-dimensional model data according to the present invention, it is possible to confirm easily and precisely whether three-dimensional model data including an attached object attached to a machine tool and at least a part of the machine tool are accurate, and hence, efficient.

LEGEND

Figure 1:
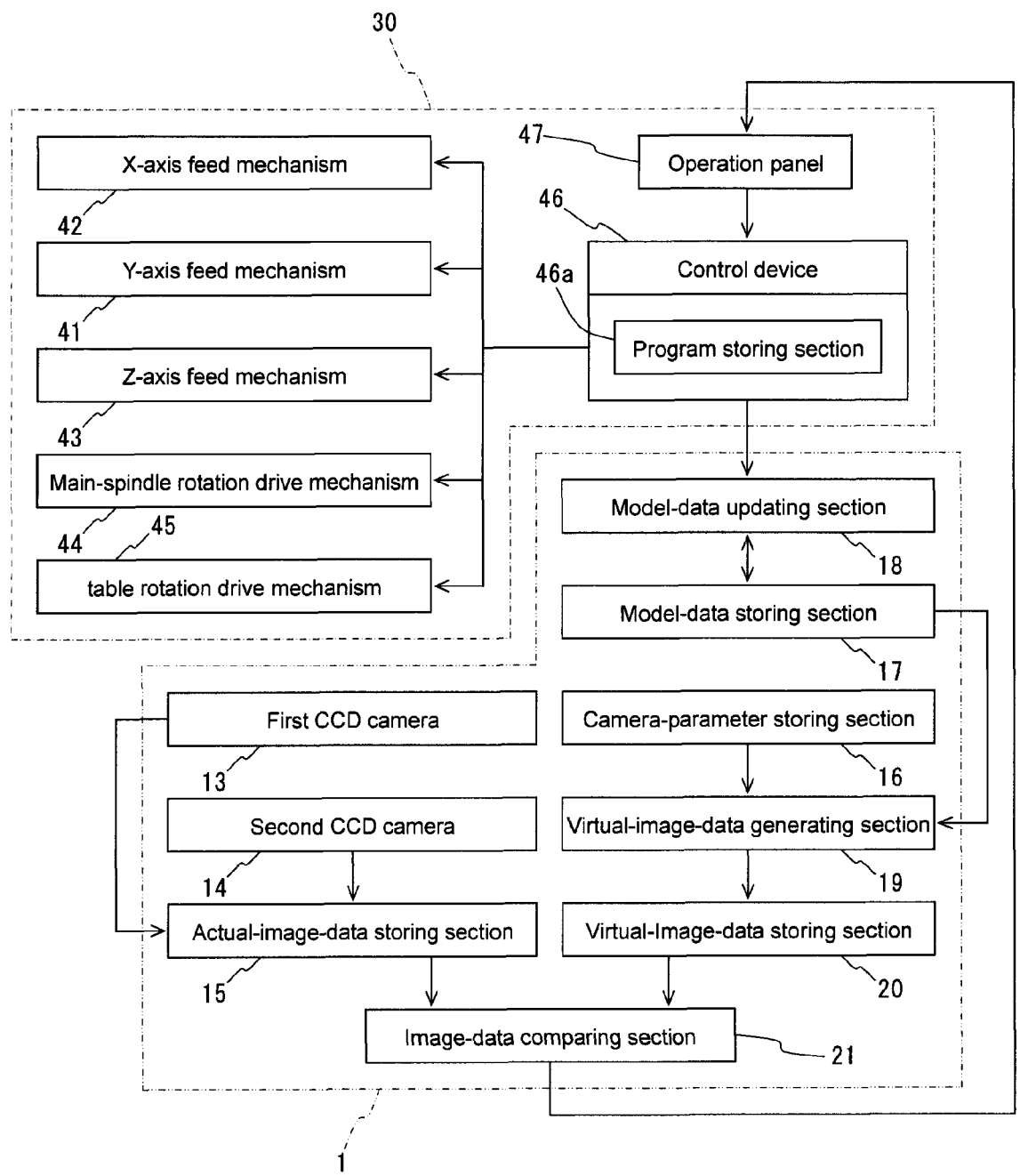
FIG. 1 is a block diagram showing a schematic configuration of an apparatus for confirming three-dimensional model data, or the like, according to one embodiment of the present invention.

1 Apparatus for confirming three-dimensional model data
10 Computer
11 Input device
12 Screen display device
13 First CCD camera
14 Second CCD camera
15 Actual-image-data storing section
16 Camera-parameter storing section
17 Model-data storing section
18 Model-data updating section
19 Virtual-image-data generating section
20 Virtual-image-data storing section
21 Image-data comparing section
30 Machine tool
31 Bed
32 Base
33 Left-side wall
34 Right-side wall
35 Back-side wall
36 First saddle
37 Second saddle
38 Spindle head
39 Main spindle
40 Table
T Tool
W Workpiece

BEST MODE FOR CARRYING OUT THE EMBODIMENT

Hereinafter, a specific embodiment of the present invention will be described with reference to the accompanying drawings. FIG. 1 is a block diagram showing a schematic configuration of an apparatus for confirming three-dimensional model data, or the like, according to one embodiment of the present invention.

Figure 2:
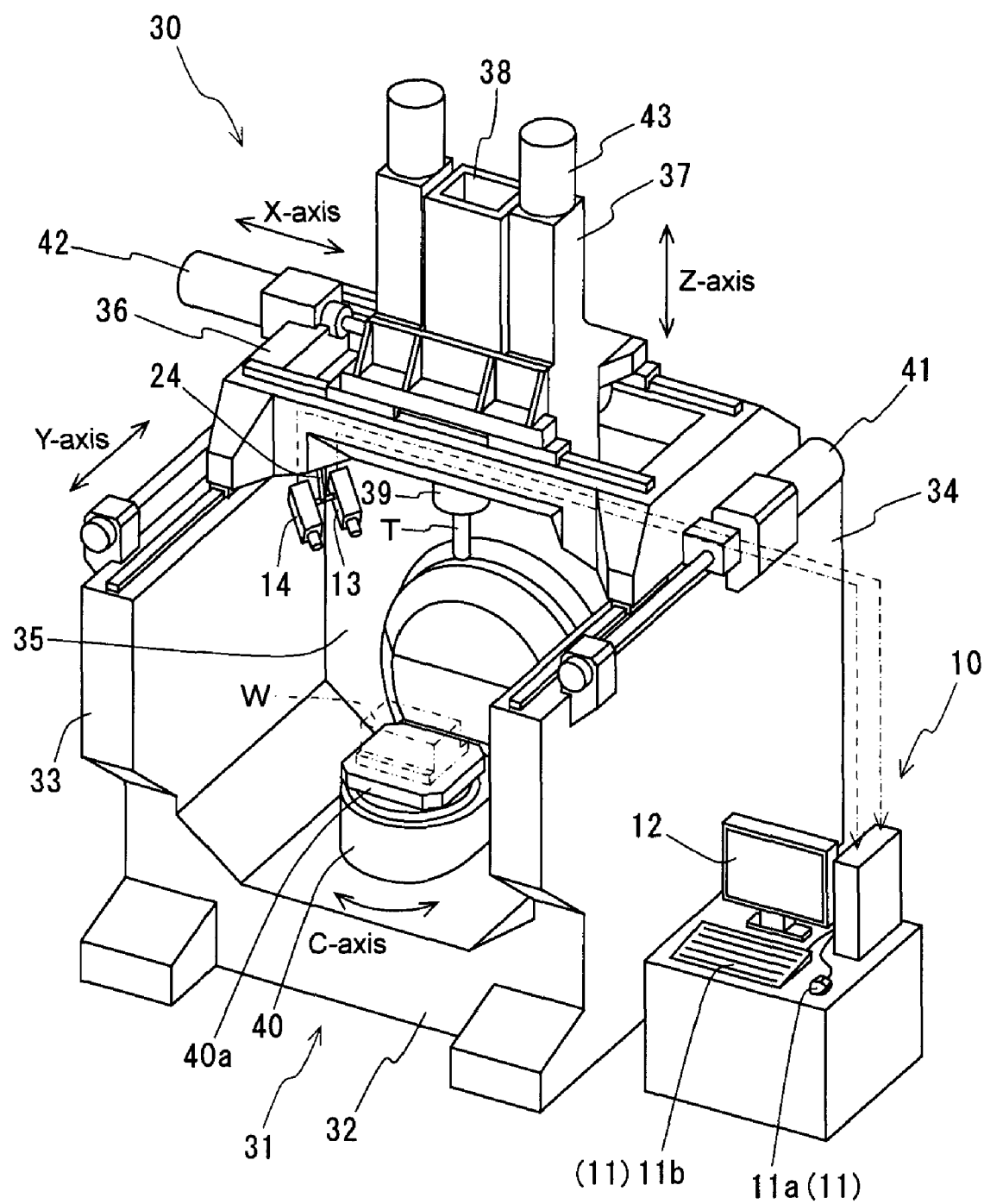
FIG. 2 is a perspective view showing the apparatus for confirming three-dimensional model data according to the embodiment, and a machine tool in which the apparatus is arranged.

As shown in FIG. 1, an apparatus 1 for confirming three-dimensional model data of this embodiment is configured by: a computer 10, a first CCD camera 13 and a second CCD camera 14 annexed to a machine tool 30 shown in FIG. 2. The computer 10 is provided with an input device 11 such as a mouse 11a, a keyboard 11b, or the like, and a screen display device 12. The computer 10 functions as: an actual-image-data storing section 15; a camera-parameter storing section 16; a model-data storing section 17; a model-data updating section 18; a virtual-image-data generating section 19; a virtual-image-data storing section 20; and an image-data comparing section 21.

Firstly, a description is given of the machine tool 30.

As shown in FIG. 1 and FIG. 2, the machine tool 30 is of a type called a vertical machining center, and is provided with: a bed 31; a first saddle 36 which is disposed on the bed 31 and freely moves in a front-to-back direction (Y-axis direction); a second saddle 37 which is disposed on the first saddle 36 and freely moves in a side-to-side direction (X-axis direction); a spindle head 38 which is disposed on the second saddle 37 and freely moves in a vertical direction (Z-axis direction); a main spindle 39 which is supported by the spindle head 38 to be rotatable about an axis and which holds a tool T; a table 40 which is disposed on the bed 31 and which has a workpiece W being mounted and fixed to its top surface; and other components. The table 40 is configured such that a mount portion 40a on which the workpiece W is mounted and fixed can rotate freely about a rotational center axis (in a C-axis direction) parallel to a Z-axis.

The machine tool 30 is further provided with: a Y-axis feed mechanism 41 for moving (moving linearly) the first saddle 36 in the Y-axis direction; an X-axis feed mechanism 42 for moving (moving linearly) the second saddle 37 in the X-axis direction; a Z-axis feed mechanism 43 for moving (moving linearly) the spindle head 38 in the Z-axis direction; a main-spindle rotation drive mechanism 44 for rotating the main spindle 39 about its axis; and a table rotation drive mechanism 45 for rotating (moving rotationally) the mount portion 40a on the table 40 in the C-axis direction to be indexed to a predetermined rotational angle position; a control device 46 for controlling operations of the Y-axis feed mechanism 41, the X-axis feed mechanism 42, the Z-axis feed mechanism 43, the main-spindle rotation drive mechanism 44, and the table rotation drive mechanism 45; and an operation panel 47 connected to the control device 46.

The bed 31 is configured by: a base 32 that is rectangular when seen in plan view; side walls 33 and 34 (left-side wall 33 and right-side wall 34) disposed upright on both right and left sides of the base 32; and a side wall (back-side wall) 35 which is disposed upright on a rear side of the base 32 and which is arranged between the side walls 33 and 34 on the both right and left sides. The table 40 is arranged at the front of the back-side wall 35 and is disposed in a space surrounded by the respective side walls 33, 34, and 35.

The first saddle 36 is supported by the left-side wall 33 and the right-side wall 34 to be movable in the Y-axis direction. The second saddle 37 is supported by the first saddle 36 to be movable in the X-axis direction. The spindle head 38 is supported by the second saddle 37 to be movable in the Z-axis direction. The main spindle 39 is disposed such that its axis is parallel to the Z-axis above the top surface of the table 40, and is supported by a bottom end of the spindle head 38 to be rotatable about the axis.

The operation panel 47 is configured by: an input device (an operation key, a keyboard, a manual pulse generator, or the like) (not shown) for inputting various signals to the control device 46; and a screen display device (not shown) for displaying on a screen a control state or the like by the control device 46.

The control device 46 is provided with a program storing section 46a in which a previously created NC program is stored, and based on the NC program, controls the feeding mechanisms 41, 42, and 43, and the rotation drive mechanisms 44 and 45. Specifically, the control device 46 extracts from the NC program movement commands regarding movement positions and feed speeds of the first saddle 36, the second saddle 37, and the spindle head 38, a rotation speed of the main spindle 39, a rotational angle position of the table 40 (mount portion 40a), or the like, so as to perform control based on the extracted movement commands, current position data fed back from the feed mechanisms 41, 42, and 43, current rotation speed data fed back from the main-spindle rotation drive mechanism 44, and current rotation angle position data fed back from the table rotation drive mechanism 45.

The control device 46 receives an operation signal (signal related to the movement command) input from the input device (not shown) of the operation panel 47, and based on the received operation signal, controls the feed mechanisms 41, 42, and 43, and the rotation drive mechanisms 44 and 45.

The control device 46 further carries out a process for transmitting to the model-data updating section 18 the movement commands extracted from the NC program, the operation signal input from the input device (not shown) of the operation panel 47, and the current position data fed back from the feed mechanisms 41, 42, and 43 or the current rotation angle position data fed back from the table rotation drive mechanism 45.

Subsequently, a description is given of the apparatus 1 for confirming three-dimensional model data.

As described above, the apparatus 1 for confirming three-dimensional model data is provided with: the first CCD camera 13; the second CCD camera 14; the actual-image-data storing section 15; the camera-parameter storing section 16; the model-data storing section 17; the model-data updating section 18; the virtual-image-data generating section 19; the virtual-image-data storing section 20; and the image-data comparing section 21.

The first CCD camera 13 and the second CCD camera 14 are arranged at a corner formed by the left-side wall 33 and the back-side wall 35 of the bed 31 and mounted via a bracket 24 in an upper area formed by the left-side wall 33 and the back-side wall 35. The first CCD camera 13 and the second CCD camera 14 tilt its optical axis in a diagonally downward direction to image the actual workpiece W mounted and fixed on the top surface of the table 40 (mount portion 40a). The second CCD camera 14 is arranged such that its optical axis is parallel to that of the first CCD camera 13, its image-pickup surface is positioned coplanar to that of the first CCD camera 13, and it is separated apart by a certain interval from the first CCD camera 13. When the workpiece W is imaged, not only the workpiece W but also a part of the table 40 is imaged.

The CCD cameras 13 and 14 each are provided with a plurality of photoelectric converters which are two-dimensionally arranged in a multi-row, multi-column array, digitize voltage signals which are output from the respective photoelectric converters in accordance with an intensity of received light, convert the digitized signals into gray level values, and output these values as two-dimensional gray-level image data which are aligned in the same manner as those of the photoelectric converters. The actual-image-data storing section 15 stores the two-dimensional gray-level image data (actual image data of the workpiece W), each of which are output from the CCD cameras 13 and 14.

The camera-parameter storing section 16 stores internal parameters (a focal length, a coordinate value of principal point, a center coordinate value of the image-pickup surface, a deviation amount between the center coordinate value of the image-pickup surface and the coordinate value of principal point, a radial distortion correction coefficient, a tangential distortion correction coefficient, for example) which are parameters specific to the CCD cameras 13 and 14, and external parameters (a rotation matrix, and a translation vector, for example) indicating positions and attitudes of the CCD cameras 13 and 14 in a coordinate system of the machine tool 30. These parameters are previously calculated by a calibration processing, for example, to be stored.

The model-data storing section 17 stores data related to a three-dimensional model of a whole of the machine tool 30 including the workpiece W mounted and fixed on the table 40 (mount portion 40a), the model data including at least shape data that define a shape of the whole of the machine tool 30 (in this embodiment, the three-dimensional model data including major constituents of the machine tool 30 and the workpiece W except for a cover, a door, or the like, of the machine tool 30). The model data are previously created by an operator, a model data generating device, or the like. The model data of the whole of the machine tool 30 are configured such that various model data which are related, for example, to constituents of the machine tool 30 such as the bed 31, the first saddle 36, the second saddle 37, the spindle head 38, the main spindle 39 (including the tool T), and the table 40; and the workpiece W are respectively correlated with one another. The model data of the whole of the machine tool 30 are set such that its coordinate system is equal to that of the actual machine tool 30.

Upon receiving the movement command, the operation signal, the current position data or the current rotation angle position data transmitted from the control device 46, the model-data updating section 18 reads out the model data of the whole of the machine tool 30 stored in the model-data storing section 17, and based on the received movement command, operation signal, current position data or current rotation angle position data, and the read-out model data, updates the model data of the whole of the machine tool 30 in such a manner that the first saddle 36, the second saddle 37, the spindle head 38, and the mount portion 40a of the table 40 are in a state of having moved (linearly moved or rotationally moved) according to the movement command or the operation signal, or in a state of having moved (linearly moved or rotationally moved) in a position related to the current position data or the current rotation angle position data. Thereafter, the model-data updating section 18 stores the updated model data into the model-data storing section 17, and rewrites the original model data with the updated model data.

Figure 3:
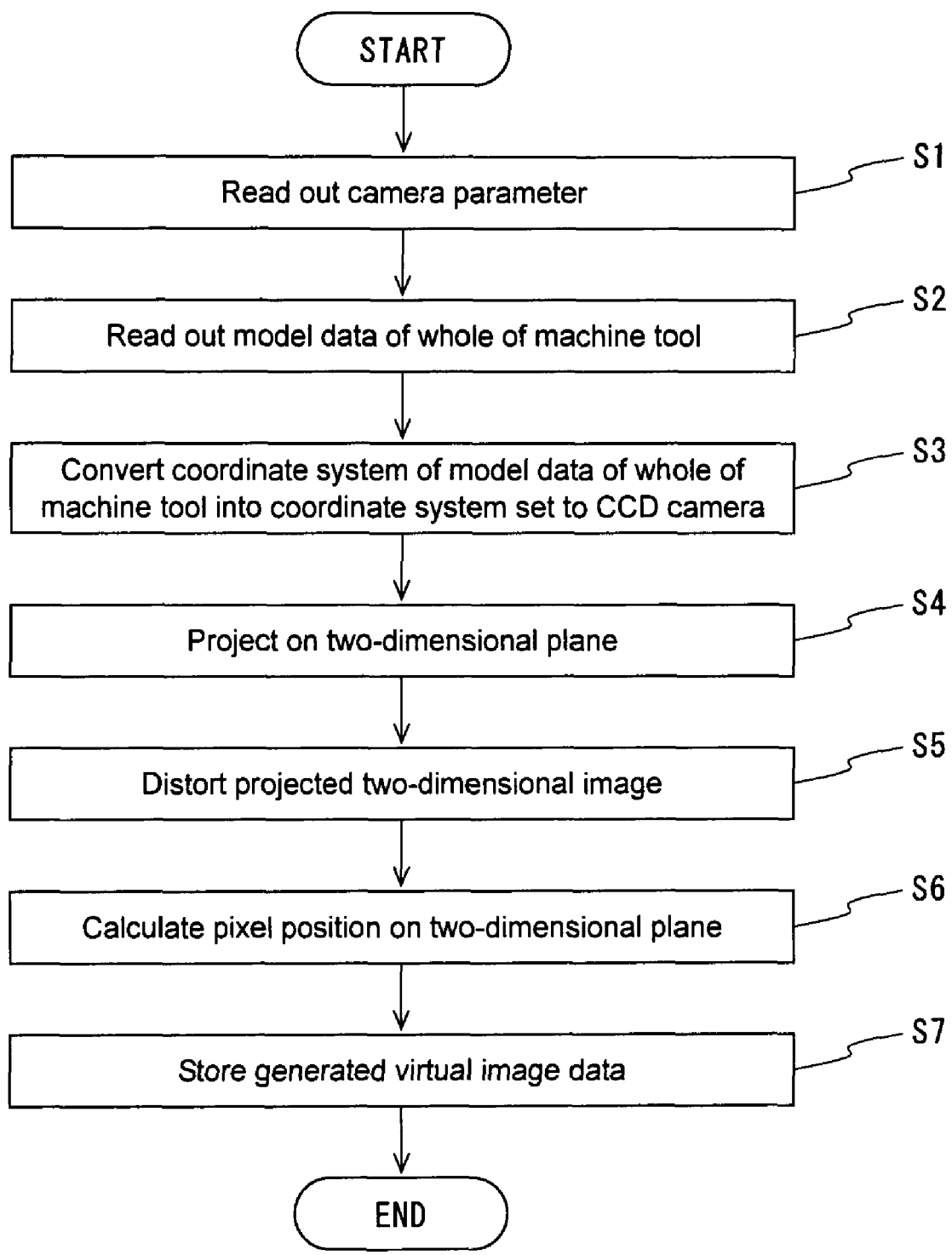
FIG. 3 is a flowchart showing a series of processes in a virtual-image-data generating section of the embodiment.

The virtual-image-data generating section 19 performs a series of processes shown in FIG. 3, and based on the external parameters (parameters indicating positions and attitudes of the CCD cameras 13 and 14) of the CCD cameras 13 and 14 stored in the camera-parameter storing section 16, the internal parameters (parameters indicating the focal length, the coordinate value of principal point, the center coordinate value of the image-pickup surface, the deviation amount between the center coordinate value of the image-pickup surface and the coordinate value of principal point, the radial distortion correction coefficient, the tangential distortion correction coefficient), and the model data stored in the model-data storing section 17, generates two-dimensional data of the workpiece W (virtual image data of the workpiece W, as described later).

The generation of a virtual image that corresponds to the first CCD camera 13, and that of a virtual image that corresponds to the second CCD camera 14 are performed in a similar manner. Thus, in the description below, a description is mainly given of the generation of the virtual image that corresponds to the first CCD camera 13, and that of the virtual image that corresponds to the second CCD camera 14 is omitted.

The virtual-image-data generating section 19, firstly, reads out the respective parameters stored in the camera-parameter storing section 16 (step S1), and then, reads out the model data of the whole of the machine tool 30 stored in the model-data storing section 17 (step S2).

Figure 5:
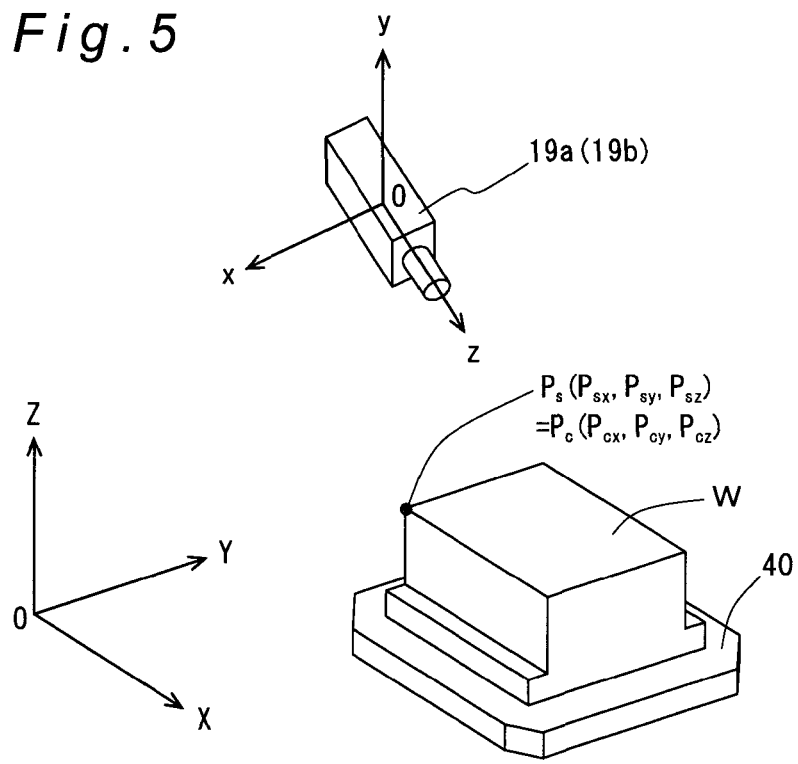
FIG. 5 is an explanatory diagram for explaining generation of virtual image data of a workpiece.

Based on the respective parameters and the model data which are read out, the virtual-image-data generating section 19 converts a coordinate system of the model data of the whole of the machine tool 30 into the same coordinate system as that set to the CCD camera 13 (14) (step S3). Specifically, the conversion is performed using the following expression (Expression 1). In the following expression, R and T denote a parameter for converting the coordinate system of the machine tool 30 into that of the CCD camera 13 (14), R denotes a rotation matrix indicating the attitude of the CCD camera 13 (14), and T denotes a translation vector indicating the position of the CCD camera 13 (14). Thereby, as shown in FIG. 5, for example, a certain point on the workpiece W is converted from a coordinate value $P_s$ ($P_{sx}$, $P_{sy}$, $P_{sz}$) in the coordinate system of the machine tool 30 into a coordinate value $P_C$ ($P_{cx}$, $P_{cy}$, $P_{cz}$) in the coordinate system of the CCD camera 13 (14), and as a result, the model data of the whole of the machine tool 30 are recognized in the same coordinate system as that of the CCD camera 13 (14).

$$P_c = R \cdot P_s + T \quad \text{[Expression 1]}$$

The process at the step S3 serves to virtually set a three-dimensional space, in which the three-dimensional model of the whole of the machine tool 30 is disposed; and to virtually set and arrange a first CCD camera 19a and a second CCD camera 19b, each of which is capable of imaging from the same view points as those of the CCD cameras 13 and 14.

Figure 6:
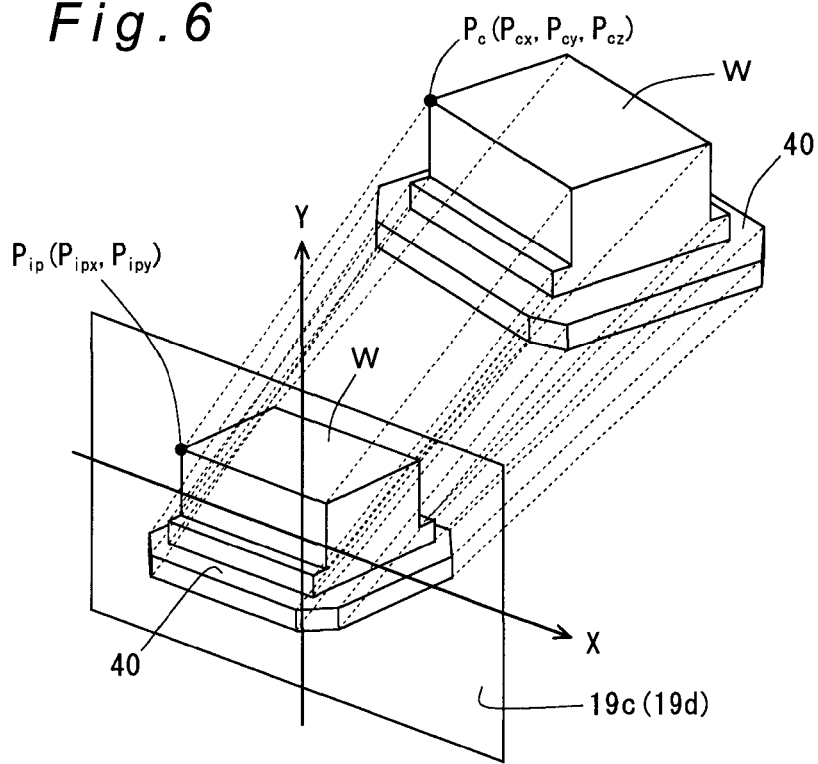
FIG. 6 is an explanatory diagram for explaining the generation of virtual image data of a workpiece.

Subsequently, the virtual-image-data generating section 19 projects a shape of a peripheral portion of the workpiece W specified by the model data in which the coordinate system is converted on an image-pickup surface 19c of the CCD camera 19a (or an image-pickup surface 19d of the CCD camera 19b) using the following expression (Expression 2), that is, the workpiece W related to the three-dimensional model is imaged by the CCD camera 19a (19b) (step S4). As a result, as shown in FIG. 6, for example, the coordinate value $P_c$ ($P_{cx}$, $P_{cy}$, $P_{cz}$) in the three-dimensional space is converted into a coordinate value $P_{ip}$ ($P_{ipx}$, $P_{ipy}$) within the image-pickup surface 19c (19d), thereby generating two-dimensional gray-level image data. It is noted that FIG. 6 simply shows a concept diagram in which the imaging of the workpiece W by the CCD camera 19a is illustrated.

$$P_{ip} = \begin{bmatrix} \frac{P_{cx}}{P_{cz}} \\ \frac{P_{cy}}{P_{cz}} \end{bmatrix} \quad \text{[Expression 2]}$$

Subsequently, the virtual-image-data generating section 19 performs a process for distorting the shape projected on the image-pickup surface 19c (19d) (that is, the two-dimensional image) (step S5). The reason for performing this process is that since the actual image generated by the CCD camera 13 (14) is distorted, the virtual image needs to be distorted as well as in the case of the actual image. Specifically, the virtual image is distorted using the following expression (Expression 3). In the expression, $K_1$ and $K_2$ denote the radial distortion correction coefficients of the CCD camera 13 (14), and $P_1$ and $P_2$ denote the tangential distortion correction coefficients of the CCD camera 13 (14). Thereby, the certain coordinate value $P_{ip}$ ($P_{ipx}$, $P_{ipy}$) is converted into a coordinate value $P_{ipd}$ ($P_{ipdx}$, $P_{ipdy}$).

$$P_{ipd} = (1 + K_1 \cdot r^2 + K_2 \cdot r^4) \begin{bmatrix} P_{ipx} \\ P_{ipy} \end{bmatrix} + dx \quad \text{[Expression 3]}$$

$$r^2 = P_{ipx}^2 + P_{ipy}^2$$

$$dx = \begin{bmatrix} 2P_1 \cdot P_{ipx} \cdot P_{ipy} + P_2(r^2 + P_{ipx}^2) \\ P_1(r^2 + P_{ipy}^2) + 2P_2 \cdot P_{ipx} \cdot P_{ipy} \end{bmatrix}$$

Thereafter, using the following expression (Expression 4), the coordinate value $P_{ipd}$ ($P_{ipdx}$, $P_{ipdy}$) on the image-pickup surface 19c (19d) of the distorted shape is calculated as a pixel position $P_{is}$ ($P_{isx}$, $P_{isy}$) (step S6). In the following expression, $u_o$ denotes a deviation amount in the X-axis direction between the center coordinate value of the image pick-up surface of the CCD camera 13 (14) and the coordinate value of the principal point; $v_o$ denotes a deviation amount in the Y-axis direction between the center coordinate value of the image pick-up surface of the CCD camera 13 (14) and the coordinate value of the principal point; $f_x$ denotes a focal length in the X-axis direction of the CCD camera 13 (14); and $f_y$ denotes a focal length in the Y-axis direction of the CCD camera 13 (14).

$$P_{is} = \begin{bmatrix} f_x \cdot P_{ipdx} + u_0 \\ f_y \cdot P_{ipdy} + v_0 \end{bmatrix} \quad \text{[Expression 4]}$$

The processes at the step S5 and S6 serve to match a condition of the virtual CCD camera 19a (19b) and a condition of the actual CCD camera 13 (14).

In this manner, when the processes of the steps S1 to S6 are performed, the three-dimensional space is virtually set and the three-dimensional model of the whole of the machine tool 30 is disposed in the space, and the camera 19a (19b) of the same condition as that of the CCD camera 13 (14) is virtually set and disposed. Consequently, the two-dimensional gray-level image data (the two-dimensional gray-level image data of the workpiece W including a part of the table 40) estimated to be obtained when the workpiece W related to the three-dimensional mode, as well as the actual workpiece W, is imaged from the same view point as that of the CCD camera 13 (14) are generated by the camera 19a (19b). The generated two-dimensional gray-level image data are then stored in the virtual-image-data storing section 20 as the virtual image data of the workpiece W (step S7), and the series of processes is completed. In the virtual-image-data storing section 20, the virtual image data that correspond to the first CCD camera 13 and the virtual image data that correspond to the second CCD camera 14 are stored, respectively.

Figure 4:
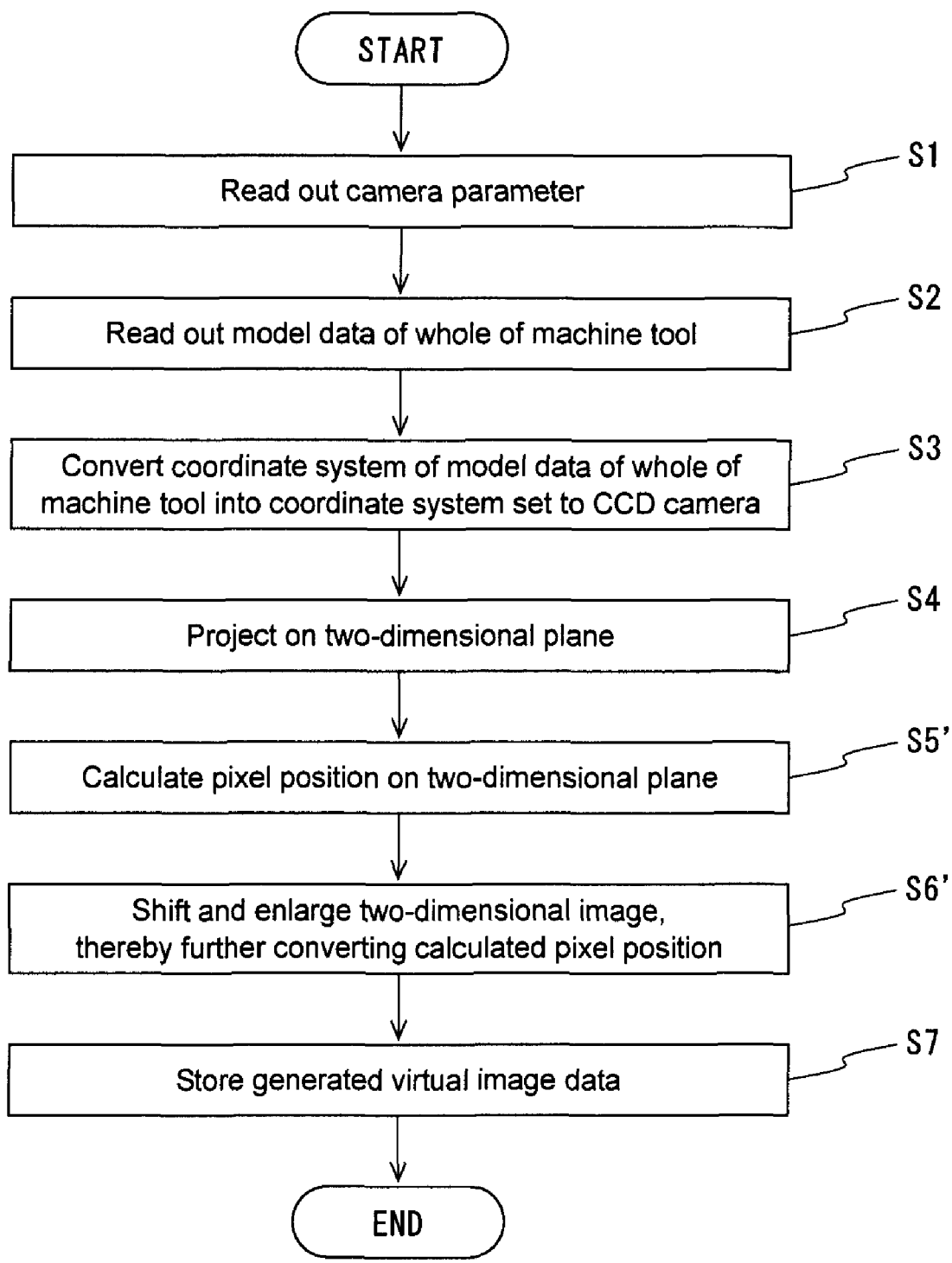
FIG. 4 is a flowchart showing a series of processes in the virtual-image-data generating section of the embodiment.

The virtual-image-data generating section 19 may perform processes at step S5' and step S6' described below, instead of the processes at the step S5 and step S6 (see FIG. 4). That is, at the step S5', using the following expression (Expression 5), the coordinate value $P_{ip}$ ($P_{ipx}$, $P_{ipy}$) of the projected shape (two-dimensional image) on the image-pickup surface 19c (19d) is calculated as a pixel position $P_v$ ($P_{vx}$, $P_{vy}$). In the following expression, f denotes a focal length of the CCD camera 13 (14); $C_x$ denotes an X-axis coordinate value of a pixel at the center of the image-pickup surface of the CCD camera 13 (14); and $C_y$ denotes a Y-axis coordinate value of a pixel at the center of the image-pickup surface of the CCD camera 13 (14).

$$P_v = \begin{bmatrix} f \cdot P_{ipx} + C_x \\ f \cdot P_{ipy} + C_y \end{bmatrix}$$ [Expression 5]

On the other hand, at the step S6', using the following expression (Expression 6) obtained by combining the Expression 4 and the Expression 5, the shape obtained at the step S5' (two-dimensional image) is shifted and enlarged. Thereby, the pixel position $P_v$ ($P_{vx}$, $P_{vy}$) obtained at the step S5' is converted into a new pixel position $P_{is}$ ($P_{isx}$, $P_{isy}$). In the following expression, upper components (with respect to the X-axis) are integers, and lower components (with respect to the Y-axis) are decimals. Therefore, with this state, however, the pixel position in the Y-axis direction cannot be evaluated, and thus, with respect to the pixel position in the Y-axis direction, a first order interpolation is performed to obtain an integer value (to eliminate a decimal portion).

$$P_{is} = \begin{bmatrix} P_{vx} + u_0 - C_x \\ \frac{f_y}{f_x} P_{vy} + v_0 - \frac{f_y}{f_x} C_y \end{bmatrix}$$ [Expression 6]

Figure 7:
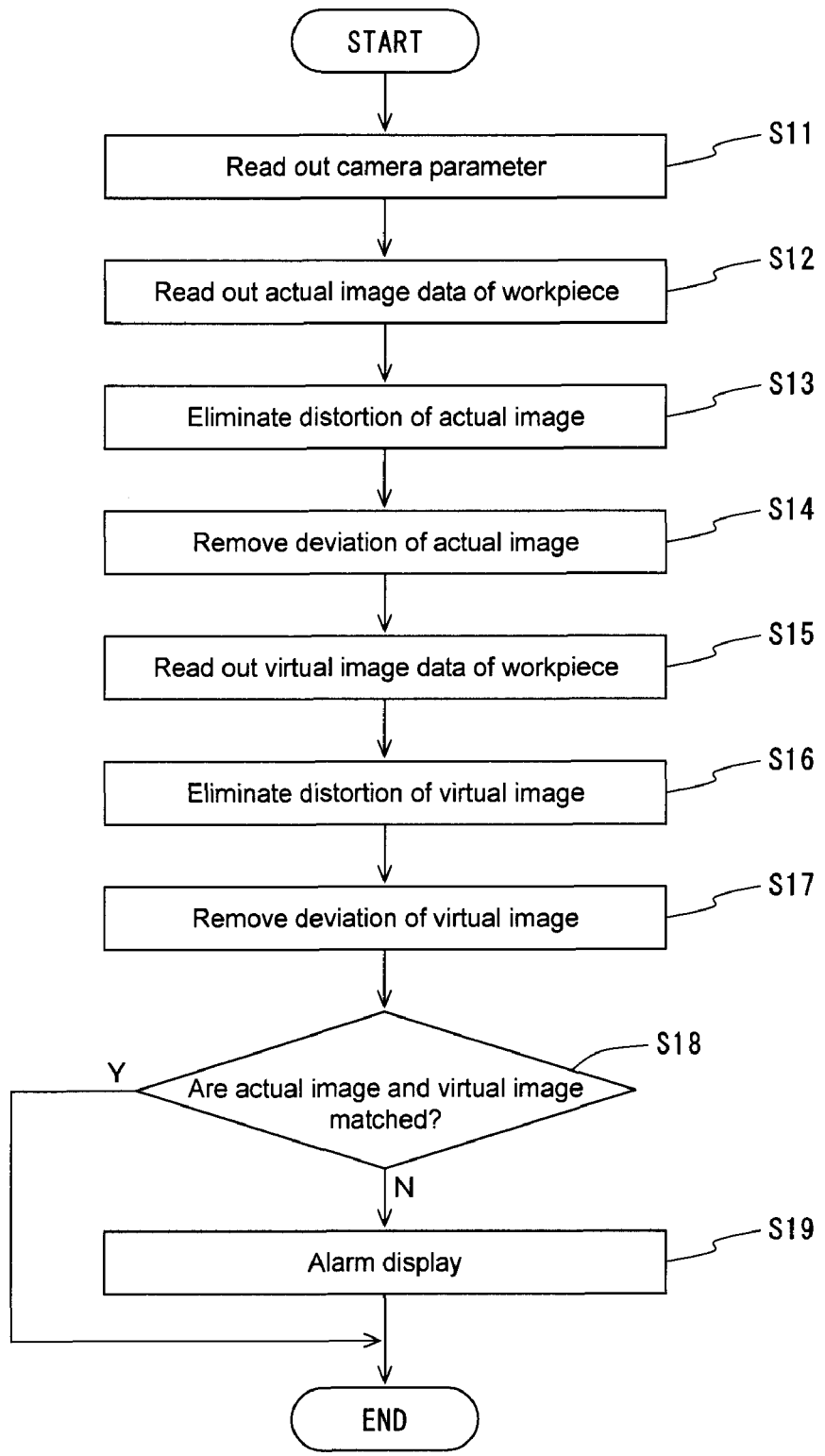
FIG. 7 is a flowchart showing a series of processes in an image-data comparing section of the embodiment.

The image-data comparing section 21 performs a series of processes shown in FIG. 7, and based on the internal parameters (parameters indicating the focal length, the coordinate value of principal point, the center coordinate value of the image-pickup surface, the deviation amount between the center coordinate value of the image-pickup surface and the coordinate value of principal point, the radial distortion correction coefficient, and the tangential distortion correction coefficient) of the CCD cameras 13 and 14 each stored in the camera parameter storing section 16; the two-dimensional image data related to the actual workpiece W (actual image of the workpiece W) stored in the actual-image-data storing section 15; and the two-dimensional gray-level image data (virtual image of the workpiece W) of the workpiece W related to the three-dimensional model stored in the virtual-image-data storing section 20, confirms whether the model data of the whole of the machine tool 30 including the workpiece W are accurate.

That is, the image-data comparing section 21 reads out the internal parameters of the CCD cameras 13 and 14 each stored in the camera-parameter storing section 16 (step S11), and then, reads out the actual-image-data (actual image data each obtained by the CCD cameras 13 and 14) of the workpiece W each stored in the actual-image-data storing section 15 (step S12).

Subsequently, based on the read-out internal parameters and each actual image data, the distortion of each actual image is eliminated (step S13), and in addition, a deviation of each actual image is removed (step S14). The reason for these steps is that the images are distorted by lenses of the CCD cameras 13 and 14, or the principal point and the center of the image pick-up surface are deviated. The distortion of the actual image can be eliminated based on the radial distortion correction coefficient and the tangential distortion correction coefficient, for example. The deviation of the actual image can be removed based on a deviation amount of the principal point, for example.

Subsequently, the virtual image data (virtual image data generated to correspond to the CCD cameras 13 and 14) of the workpiece W each stored in the virtual-image-data storing section 20 are read out (step S15), and based on the virtual image data each read out and the internal parameters read out at the step S11, a distortion of each virtual image, as well as the actual image, is eliminated (step S16), and in addition, a deviation of each virtual image also is removed (step S17).

In the case where in the processes of the virtual-image-data generating section 19, the processes at the step S5' and S'6 are performed instead of the processes at the step S5 and S6, the process at the step S16 can be omitted.

Subsequently, the actual image data obtained by the first CCD camera 13 and the virtual image data generated to correspond to the first CCD camera 13; and the actual image data obtained by the second CCD camera 14 and the virtual image data generated to correspond to the second CCD camera 14 are compared, respectively, to determine whether these image data match (step S18).

Specifically, for example, the determination is performed by confirming whether the gray level value of each pixel in the actual image data is the same as that of each pixel in the virtual image data, detecting edges of the workpiece W from the actual image data and the virtual image data to confirm whether positions and lengths of the detected edges are the same, and so on. In the case where the gray level value of each pixel of the actual image data and that of the virtual image data are the same, or in the case where the positions and the lengths of the edges detected from the actual image data and those of the virtual image data are the same, it is determined that the actual image data and the virtual image data match. In order to admit that the actual image data and the virtual image data match, out of two pairs of actual image data and virtual image data, two pairs, but not either one of the two pairs, need to match, respectively.

When the actual image data and the virtual image data match, it is determined that the three-dimensional model data of the whole of the machine tool 30 are accurate, that is, the shape of the workpiece W, the mounting position thereof, and the mounting attitude thereof match those of the actual workpiece W (step S18). Then, the series of processes is completed. On the other hand, when the actual image data and the virtual image data do not match, it is determined that the three-dimensional model data of the whole of the machine tool 30 are wrong, that is, the shape of the workpiece W, the mounting position thereof, and the mounting attitude thereof do not match those of the actual workpiece W (step S18), a message to this effect is displayed on the screen display device (not shown) of the operation panel 47 or on the screen display device 12 of the computer 10 (step S19). Then, the series of processes is completed.

According to the thus-configured apparatus 1 for confirming three-dimensional model data of the embodiment, the internal parameters and the external parameters of the CCD cameras 13 and 14 are previously stored in the camera-parameter storing section 16, and the model data of the whole of the machine tool 30 including the workpiece W are stored in the model-data storing section 17. The model data stored in the model-data storing section 17 are updated, as needed, by the model-data updating section 18 based on the movement command, the operation signal, the current position data, and the current rotation angle position data transmitted from the control device 46.

When the actual workpiece W on the table 40 is imaged by the CCD cameras 13 and 14, the actual image data of the workpiece W including a part of the table 40 are generated, and the generated data are stored in the actual-image-data storing section 15.

Based on the external parameters and the internal parameters of the CCD cameras 13 and 14 stored in the camera-parameter storing section 16, and the model data stored in the model-data storing section 17, the virtual image data of the workpiece W estimated to be obtained when the workpiece W related to the three-dimensional model is imaged from the same view points as those of the CCD cameras 13 and 14, respectively, are generated by the virtual-image-data generating section 19. The generated data are stored in the virtual-image-data storing section 20.

Thereafter, based on the internal parameters of the CCD cameras 13 and 14 stored in the camera parameter storing section 16, the actual image data of the workpiece W stored in the actual-image-data storing section 15, and the virtual image data of the workpiece W stored in the virtual image data storing section 20, it is determined by the image-data comparing section 21 whether the model data of the whole of the machine tool 30 including the workpiece W are accurate. In the case where it is determined that the model data are wrong, the message to this effect is displayed on the screen display device (not shown) of the operation panel 47 or on the screen display device 12 of the computer 10, for example.

In this manner, according to the apparatus 1 for confirming three-dimensional model data of the embodiment, the actual image of the workpiece W obtained by the CCD cameras 13 and 14 and the virtual image of the workpiece W generated based on the three-dimensional model data of the whole of the machine tool 30 are compared to determine whether the three-dimensional model data of the whole of the machine tool 30 including the workpiece W are in accordance with the actual state of the machine tool 30. Therefore, it is possible to confirm easily, efficiently, and precisely whether the three-dimensional model data of the whole of the machine tool 30 are accurate.

Further, it is possible to prevent the interference simulation in which inaccurate three-dimensional model data is used, for example, or possible to prevent a case where it is determined that there is no error in the NC program by the interference simulation using the wrong three-dimensional model data, and the machining is performed according to such an NC program.

Thus, one embodiment of the present invention has been described above. It is a matter of course that specific modes in which the present invention can be realized are not limited thereto.

In the above-described embodiment, the present invention is designed to confirm whether the three-dimensional model data of the whole of the machine tool 30 including the workpiece W on the table 40 are accurate. However, since a jig is generally used in fixing the workpiece W on the table 40, it may be possible to confirm whether the three-dimensional model data of the whole of the machine tool 30 including the workpiece W and the jig for fixing the workpiece W are accurate. Further, in addition thereto, it may also be possible to confirm whether the three-dimensional model data of the whole of the machine tool 30 including the jig are accurate.

In the case of confirming whether the three-dimensional model data of the whole of the machine tool 30 including the workpiece W and the jig are accurate, the three-dimensional model data of the whole of the machine tool 30 including the workpiece W and the jig are stored in the model-data storing section 17, the workpiece W and the jig are imaged by the CCD cameras 13 and 14 to generate the actual image data, at the same time, virtual image data of the workpiece W and the jig are generated by the virtual-image-data generating section 19, and the actual image data and the virtual image data are compared by the image-data comparing section 21, whereby it is determined whether the three-dimensional model data of the whole of the machine tool 30 including the workpiece W and the jig are accurate. On the other hand, in the case of confirming whether the three-dimensional model data of the whole of the machine tool 30 including the jig are accurate, the three-dimensional model data of the whole of the machine tool 30 including the jig are stored in the model-data storing section 17, the jig is imaged by the CCD cameras 13 and 14 to generate the actual image data, at the same time, virtual image data of the jig are generated by the virtual-image-data generating section 19, and the actual image data and the virtual image data are compared by the image-data comparing section 21, whereby it is determined whether the three-dimensional model data of the whole of the machine tool 30 including the jig are accurate.

The order in which the process for imaging the actual workpiece W by the CCD cameras 13 and 14 to generate the actual image data and the process for generating the virtual image data of the workpiece W by the virtual-image-data generating section 19 are executed is not particularly limited. Either one of the processes may be performed first.

When the mount portion 40a of the table 40 is rotated in a C-axis direction to image the workpiece W from a plurality of rotational angle positions, and the resultant actual image imaged from each rotational angle position and the virtual image are compared, it becomes possible to determine more precisely whether the model data of the whole of the machine tool 30 are accurate.

Further, it is not limited, in particular, in what cases whether the model data of the whole of the machine tool 30 are accurate is confirmed. For example, the confirmation may be performed when a machining start button provided on the operation panel 47 is depressed by an operator. In this case, a confirmation process is performed before a machining operation is executed, and when it is determined that the model data of the whole of the machine tool 30 are wrong, an alarm is output to stop the machining operation. Besides, the confirmation may also be performed when the operator finishes a machining preparation, and then, depresses a confirmation button provided on the operation panel 47.

It is not always necessary that two CCD cameras 13 and 14 be arranged, and the second CCD camera 14 may be omitted. In this case, the actual image data obtained by the first CCD camera 13 and the virtual image data generated to correspond to the first CCD camera 13 are compared, thereby determining whether the model data of the whole of the machine tool 30 are accurate. In addition, when the workpiece W is imaged in a position that corresponds to a position where the first CCD camera 13 is disposed and in a position that corresponds to a position where the second CCD camera 14 is disposed, similarly to the above case, it becomes possible to determine whether the model data of the whole of the machine tool 30 are accurate based on the two-dimensional gray-level image of two different view points.

The machine tool 30 in which the apparatus 1 for confirming three-dimensional model data is provided is not limited, and any machine tool 30 may be possible. For example, the machine tool 30 may be arranged not only in the vertical machining center as in the embodiment but also in a lathe or the like.

Further, the CCD cameras 13 and 14 may be configured not to output the two-dimensional gray-level image data but to output two-dimensional color images, and the virtual-image-data generating section 19 may be configured not to generate the two-dimensional gray-level image data but to generate two-dimensional color images to determine whether the model data of the whole of the machine tool 30 including the workpiece W are accurate based on the color images.

Industrial Applicability

As described in detail above, the present invention is applicable to a method and an apparatus for confirming three-dimensional model data, which confirm whether model data which are previously created, the three-dimensional model data including a attached object attached to a machine tool and at least a part of the machine tool, are accurate.

The invention claimed is:

1. A method for confirming three-dimensional model data, which confirms whether data which are previously created and are related to a three-dimensional model including an attached object attached to a machine tool and at least a part of the machine tool, the three-dimensional model data including at least shape data which define shapes of the machine tool and the attached object, are accurate, the method comprising:
   an actual-image-data generating process in which an actual attached object attached to the machine tool is imaged by an imaging camera from previously set one or more view point to generate two-dimensional image data;
   a virtual-image-data generating process for generating, by a computer process, two-dimensional image data of the attached object based on the three-dimensional model data which are previously created and include the attached object and the at least a part of the machine tool, the process in which a three-dimensional space is virtually set, the three-dimensional model including the attached object and the at least a part of the machine tool is disposed within the space, and a camera of the same condition as that of the imaging camera is virtually set and disposed, thereby generating the two-dimensional image data estimated to be obtained when the attached object related to the three-dimensional model, as well as the actual attached object, is imaged by the camera virtually set and disposed from the same view point as the previously set view point; and
   an image-data comparing process for comparing, by a computer process, the two-dimensional image data related to the actual attached object generated in the actual-image-data generating process and the two-dimensional image data of the attached object related to the three-dimensional model generated in the virtual-image-data generating process to determine whether these two-dimensional image data match, wherein the image-data comparing means compares a gray level value of each pixel in the two-dimensional image data generated by the imaging camera and a gray level value of each pixel in the two-dimensional image data generated by the virtual-image-data generating means to determine whether these gray level values match.

2. An apparatus for confirming three-dimensional model data, which confirms whether data which are previously created and are related to a three-dimensional model including an attached object attached to the machine tool and at least a part of the machine tool, the three-dimensional model data including at least shape data which define shapes of the machine tool and the attached object, are accurate, the apparatus comprising:
   an imaging camera for imaging an actual attached object attached to the machine tool from previously set one or more view point to generate two-dimensional image data; and
   a computer to which the imaging camera is connected, wherein the computer is configured to function as:
   model-data storing means for storing the three-dimensional model data which are previously created and include the attached object and the at least a part of the machine tool;
   virtual-image-data generating means for generating two-dimensional image data of the attached object based on the three-dimensional model data stored in the model-data storing means, the means in which a three-dimensional space is virtually set, the three-dimensional model including the attached object and the at least a part of the machine tool is disposed within the space, and a camera of the same condition as that of the imaging camera is virtually set and disposed, thereby generating the two-dimensional image data estimated to be obtained when the attached object related to the three-dimensional model, as well as the actual attached object, is imaged by the camera virtually set and disposed from the same view point as the previously set view point; and
   image-data comparing means for comparing the two-dimensional image data related to the actual attached object generated by the imaging camera and the two-dimensional image data of the attached object related to the three-dimensional model generated by the virtual-image-data generating means to determine whether these two-dimensional image data match, wherein the image-data comparing means compares a gray level value of each pixel in the two-dimensional image data generated by the imaging camera and a gray level value of each pixel in the two-dimensional image data generated by the virtual-image-data generating means to determine whether these gray level values match.

3. An apparatus for confirming three-dimensional model data arranged in a machine tool which comprises:
   a structural member configured to be movable, and to which an attached object is attached; drive means for driving the structural member; and
   control means that controls an operation of the drive means based on a movement command of the structural member to control a movement of the structural member, the apparatus for confirming whether data which are previously created and are related to a three-dimensional model including an attached object attached to the machine tool and at least a part of the machine tool, the three-dimensional model data including at least shape data which define shapes of the machine tool and the attached object, are accurate, comprising:
   an imaging camera for imaging an actual attached object attached to the machine tool from previously set one or more view point to generate two-dimensional image data; and
   a computer to which the imaging camera is connected, wherein the computer is configured to function as:
   model-data storing means for storing the three-dimensional model data which are previously created and include the attached object and the at least a part of the machine tool;
   model-data updating means that receives from the control means the movement command or position information of the structural member, and based on the received movement command or position information, and the three-dimensional model data stored in the model-data-storing means, updates the three-dimensional model data related to the at least a part of the machine tool such that the structural member is in a state of having moved according to the movement command or the structural member is in a state of having moved in a position according to the position information;

virtual-image-data generating means for generating two-dimensional image data of the attached object based on the three-dimensional model data updated by the model-data updating means, the means in which a three-dimensional space is virtually set, the three-dimensional model including the attached object and the at least a part of the machine tool is disposed within the space, and a camera of the same condition as that of the imaging camera is virtually set and disposed, thereby generating the two-dimensional image data estimated to be obtained when the attached object related to the three-dimensional model, as well as the actual attached object, is imaged by the camera virtually set and disposed from the same view point as the previously set view point; and image-data comparing means for comparing the two-dimensional image data related to the actual attached object generated by the imaging camera and the two-dimensional image data of the attached object related to the three-dimensional model generated by the virtual-image-data generating means to determine whether these two-dimensional image data match, wherein the image-data comparing means compares a gray level value of each pixel in the two-dimensional image data generated by the imaging camera and a gray level value of each pixel in the two-dimensional image data generated by the virtual-image-data generating means to determine whether these gray level values match.

* * * * *